US010259113B2

(12) United States Patent  
Mackin et al.

(10) Patent No.: US 10,259,113 B2  
(45) Date of Patent: Apr. 16, 2019

(54) REINFORCED LOWER HANDLE FOR HAND TOOL ASSEMBLY AND METHOD OF MANUFACTURE

(71) Applicants: John Mackin, Dublin, OH (US);  
William Krupnick, Kamas, UT (US);  
Samuel Krupnick, San Diego, CA (US)

(72) Inventors: John Mackin, Dublin, OH (US);  
William Krupnick, Kamas, UT (US);  
Samuel Krupnick, San Diego, CA (US)

(73) Assignee: Yeoman & Company, Monticello, IA (US)

( * ) Notice: Subject to any disclaimer, the term of this patent is extended or adjusted under 35 U.S.C. 154(b) by 0 days.

(21) Appl. No.: 15/839,490

(22) Filed: Dec. 12, 2017

(65) Prior Publication Data

US 2018/0099402 A1 Apr. 12, 2018

Related U.S. Application Data

(63) Continuation of application No. 15/146,436, filed on May 4, 2016, now Pat. No. 9,878,438.

(60) Provisional application No. 62/156,743, filed on May 4, 2015.

(51) Int. Cl.
| | |
|---|---|
| *B25G 3/10* | (2006.01) |
| *A01B 1/02* | (2006.01) |
| *B25G 3/34* | (2006.01) |
| *A01B 1/22* | (2006.01) |
| *B25G 3/12* | (2006.01) |

(52) U.S. Cl.  
CPC .................. *B25G 3/10* (2013.01); *A01B 1/02* (2013.01); *A01B 1/22* (2013.01); *B25G 3/12* (2013.01); *B25G 3/34* (2013.01)

(58) Field of Classification Search  
CPC ..................................... B25G 3/10; A01B 1/02  
USPC ......... 294/49, 53.5, 57, 58, 50.7, 50.8, 50.9; 56/400.12; D8/10  
See application file for complete search history.

(56) References Cited

U.S. PATENT DOCUMENTS

| | | | | | |
|---|---|---|---|---|---|
| 3,549,189 | A | * | 12/1970 | Alosi ..................... | A01B 1/227 294/57 |
| 3,619,009 | A | * | 11/1971 | O'Leary ................. | E21C 37/02 138/143 |
| 4,050,727 | A | * | 9/1977 | Bonnes .................... | A01B 1/22 16/110.1 |

(Continued)

*Primary Examiner* — Paul T Chin  
(74) *Attorney, Agent, or Firm* — Nyemaster Goode, PC

(57) ABSTRACT

A hand tool assembly generally comprising a handle and a tool head combined by a connector. The handle has a first end and a second end. The connector has a first end and a second end. The first end of the connector is combined with the second end of the handle. The second end of the connector is combined with the head of a tool by inserting the connector into a socket/opening in the tool's head. The second end of the connector is flexible thereby allowing it to conform to the shape of the socket regardless of whether the socket is straight or curved. A rigid tube insert is positioned a short distance into the handle second end and extends a short distance outward from the handle second end. Adhesives, fasteners, internal hooks, or other commonly known methods of securing an object within an outer sheath or covering may be used to help secure the components together.

15 Claims, 4 Drawing Sheets

(56) References Cited

U.S. PATENT DOCUMENTS

| | | | | | |
|---|---|---|---|---|---|
| 4,301,109 | A | * | 11/1981 | Kain | B29C 31/041 198/824 |
| 4,451,073 | A | * | 5/1984 | Carmien | A01B 1/22 16/110.1 |
| 4,639,029 | A | * | 1/1987 | Kolonia | A01B 1/227 16/110.1 |
| 5,415,448 | A | * | 5/1995 | Keathley | A01B 1/222 16/422 |
| 5,632,837 | A | * | 5/1997 | Carmien | B25G 1/10 156/172 |
| 5,643,520 | A | * | 7/1997 | Carmien | B29C 65/44 264/249 |
| 5,699,700 | A | * | 12/1997 | Carmien | A01B 1/02 29/525.12 |
| 5,921,700 | A | * | 7/1999 | Haver | A01B 1/227 16/108 |
| 6,199,245 | B1 | * | 3/2001 | Blessing | B25G 1/06 16/422 |
| 8,746,767 | B2 | * | 6/2014 | Mouch | B25G 1/04 15/145 |

* cited by examiner

REINFORCED LOWER HANDLE FOR HAND TOOL ASSEMBLY AND METHOD OF MANUFACTURE

CROSS-REFERENCE TO RELATED APPLICATIONS

This is a Continuation Application of U.S. patent application Ser. No. 15/146,436 filed May 4, 2016, said '436 application based upon U.S. Provisional Patent Application Ser. No. 62/156,743 filed May 4, 2015, the complete disclosures of which are hereby expressly incorporated by this reference.

FIELD OF THE INVENTION

This invention relates generally to hand tools such as shovels, rakes, axes, pitchforks or the like and more specifically to devices and methods which use a flexible connector for combining the handle of a tool with the head of the tool.

BACKGROUND

Historically, most hand tools include an opening/socket in the metal neck of the work piece head into which a wooden handle is inserted and fixed by means of friction or by fasteners such as rivets, screw, nails, collars, or the like. The metal socket in the head was needed to provide adequate strength at the connection to allow the wooden handle to function while resisting collapse when subjected to bending or torsional stress.

The length of the socket can be modified during manufacture depending on the amount of stress for the desired operation, the length of the shovel handle, and the quality of the wood in the shovel handle. Further, the head can be produced either by stamping and forming metal sheet stock for light duty applications or by using a billet and forging a heavy duty blade for heavy duty application. In virtually all operations whether the shovel blade was made from very thin metal for very low priced and light duty work, or forged from a billet to produce a heavy duty blade, the handle socket is formed by rolling the sheet or forged stock into a conical section. The conical section is prevented from opening by using metal to resist deflection or by either welding the edges together or bolting through the handle shaft stock so that the conical section would not spread out or open up when load was applied on the handle.

The sockets can be either straight or curved along their length. The straight sockets are straight from the opening which will accept the wood handle to the connection or junction of the tool blade. The curved sockets are curved near the smallest point of the socket section so as to create a desired angle between the plane of the blade and the axis of the shovel handle. The strength of the connection is increased when the wooden handle fills the entire volume of the socket. This wood filler helps to resist a compressive failure of the metal conical section when the tool is used as a pry in either digging or actually prying. This failure will occur on every quality tool at a relatively low load level if a core is not inserted which has adequate compressive strength to prevent the collapse of the conical tubing section which has been created out of sheet stock or by forging.

It has been found that fiberglass handles are preferable to wood handles for many reasons, including the fact that fiberglass has a more desirable strength to weight ratio. Most fiberglass handles are produced from a thermosetting process which is irreversible, that is, it cannot be softened by the re-application of heat. It is difficult and costly to attempt to machine the fiberglass to be inserted in a socket which has an angle or curve as above described.

Therefore, there is a need for an improved connection assembly between the handle and the head of a hand tool.

SUMMARY

One aspect of the present invention includes a hand tool assembly generally comprising a handle and a tool head combined by a connector. The handle has a first end and a second end. The connector has a first end and a second end. The first end of the connector is combined with the second end of the handle. In one embodiment the connector is permanently secured to the handle by molding the connector around the end of the handle. The second end of the connector is combined with the head of a tool (such as a shovel) by inserting the connector into a socket/opening in the tool's head. The second end of the connector is flexible thereby allowing it to conform to the shape of the socket and contact the internal surface of the socket along its length regardless of whether the socket is straight or curved. Adhesives or fasteners may be used to help secure the components together. In some embodiments a rigid tube insert is positioned a short distance into the handle second end and extends a short distance outward from the handle second end so that it is combined with the first end of the connector along with the second end of the handle. The rigid tube insert helps provide strength and rigidity at the connection between the handle and the tool head since this connection point is often vulnerable to cracking or breaking.

Another aspect of the present invention includes a connector for connecting a handle to a head of a hand tool. The connector includes a first end and a second end. The first end of the connector has an opening adapted to receive a portion of the handle and/or the rigid tool insert described above to help secure the handle to the connector. The second end of the connector is received by a socket in the tool head to help secure the tool head to the connector. In this manner, a first portion of the connector is combined with the handle and a second portion is combined with the tool head to help secure the components together. The first end of the connector may include a collar portion having a larger diameter than the main body portion. An opening or slot is created between the main body of the connector and the outer collar portion. The outer surface of the tool head's socket is received by the opening/slot to help secure the head to the handle assembly and provide stability and rigidity during operation of the tool. The second end of the connector may include a first series of grooves spaced from each other along the length of one side and a second series of grooves spaced from each other along the length of another side. The grooves help the connector to bend as it combines with the tool head in the event the tool head's socket is curved. The first series of grooves are larger (deeper and wider) than the second series of grooves. The wider first series of grooves help the connector bend in that direction.

Another aspect of the present invention includes a method for forming a hand tool assembly such as the assembly described above. In this method, the handle assembly is formed first by combining the handle, rigid tube insert, and connector. The grooved/second end of the connector is then inserted into the tool head's socket. More specifically, the rigid tube insert is positioned a short distance into the opening in the handle second end so that it extends a short distance outward from the handle second end. The handle and rigid tube insert are then placed in a mold wherein the first end of the connector is molded around them to create a permanent connection. After creating the one-piece handle assembly which includes the handle, rigid tube insert, and connector, the second end of the connector is then inserted into an opening/socket in a work piece head (e.g., a shovel or rake head).

The present invention results in substantially increased resistance to bending, deformation and failure. Along with this increased strength, the handle/tool head construction which is easier to manufacture than is found in making existing tools. The increased strength around the connection point means that the handle does not require as much material along its length which reduces weight and manufacturing costs.

DETAILED DESCRIPTION

Figure 1:
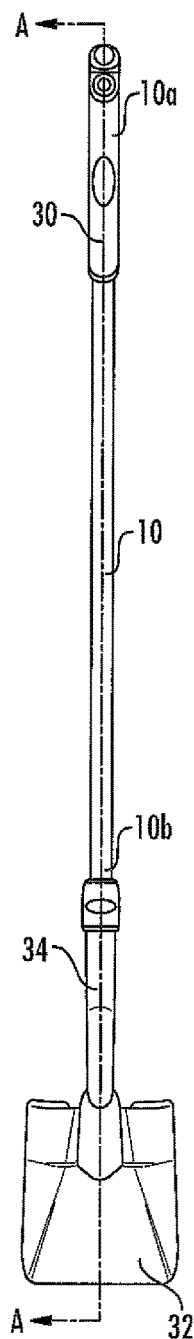
FIG. 1 is a front view of a shovel which is used herein as an exemplary hand tool.
Figure 2:
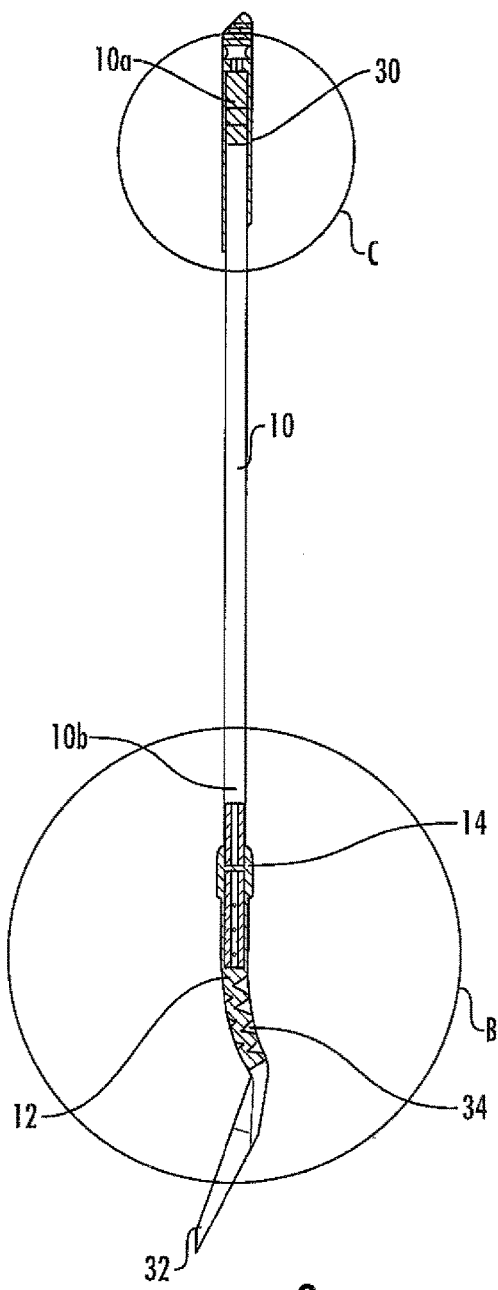
FIG. 2 is a side section view of the shovel taken along section lines A-A from FIG. 1.

As shown in FIGS. 1-5, one aspect of the present invention includes a hand tool assembly generally comprising a handle 10 and a tool head 32 combined by a connector 12. The handle 10 has a first end 10a and a second end 10b. The elongated handle 10 may be made from any suitable material including metal, wood, or fiberglass. In one embodiment a gripping means 30 may be combined with the handle first end 10a to increase comfort and ease of use. The connector 12 has a first end 12a and a second end 12b (see FIGS. 6-9). The first end of the connector 12a has an opening 20 adapted to receive the second end of the handle 10b. The second end of the connector 12b is adapted to be inserted into the socket 34 of the tool's head 32 to help fill the void inside the socket 34. The socket 34 may be in a straight configuration, curvilinear, or arced configuration. The connector 12 is flexible thereby allowing it to bend and conform to the shape of the socket 34 including curvatures greater than shown in FIG. 3. In some embodiments the angle of curvature may be even greater than the curvature shown in FIG. 3. Even with greater curvature, however, the connector 12 bends to fill the internal volume of the socket 34 by contacting the internal surface of the socket 34 generally along the length of the socket's 34 curve. In some embodiments, the connector 12 contacts the internal surface of the socket 34 along the socket's 34 entire length.

Figure 3:
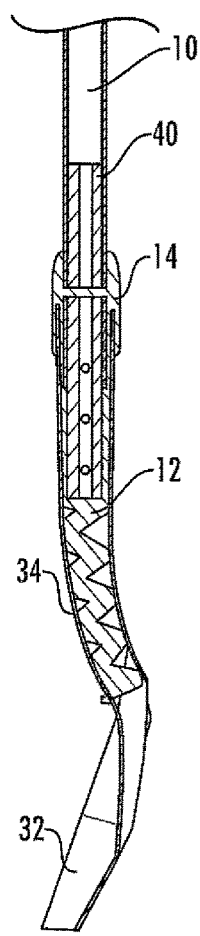
FIG. 3 is a detailed view of area B from FIG. 2.

In some embodiments a rigid tube insert 40 is used to help strengthen the connection between the handle 10 and the tool head 32. A first portion of the insert 40 is positioned a short distance into the handle second end 10b and a second portion of the insert 40 extends a short distance outward from the handle second end 10b as shown best in FIGS. 4a, 4b, and 4c. The second portion of the insert 40 is received into the opening in the first end of the connector 12 along with a portion of the handle second end 10b as best shown in FIG. 3. The rigid tube insert 40 helps provide strength and rigidity at the connection between the handle 10 and the tool head 32 since this connection point is often vulnerable to cracking or breaking.

One aspect of the invention relates to the flexible connector 12 which, as described above, is used to combine the handle 10 with the head 32. The connector 12 may be permanently combined with the handle 10 during the manufacturing process as explained below, or it may be combined using adhesives or fasteners so it can be an aftermarket add-on feature. In one embodiment, the handle second end 10b is combined with the connector first end 12a. The connector second end 12b is thereafter driven into an opening in the head socket 34 to provide compressive support for that portion of the socket 34. The flexible connector 12 can be sized and shaped to correspond to the shape of the opening in any tool socket in which it may be used, and in this connection is generally an elongated frustum of a cone, since the interior of most sockets 34 is slightly tapered. As shown in FIG. 3, the flexibility of the connector 12 allows it to bend with the shape of a curved socket to help fill the volume inside the socket along its entire length.

Figure 7:
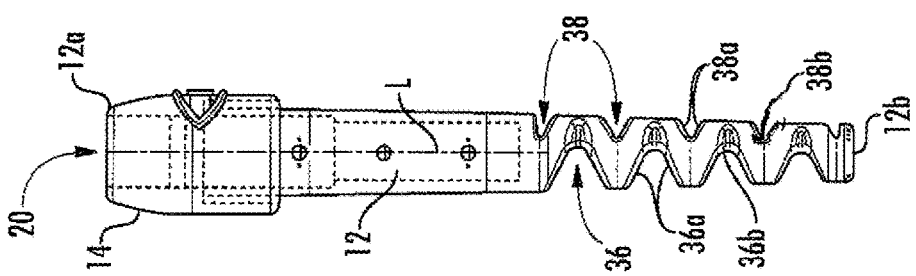
FIG. 7 is a section view of the connector taken along section lines C-C from FIG. 6.
Figure 8:
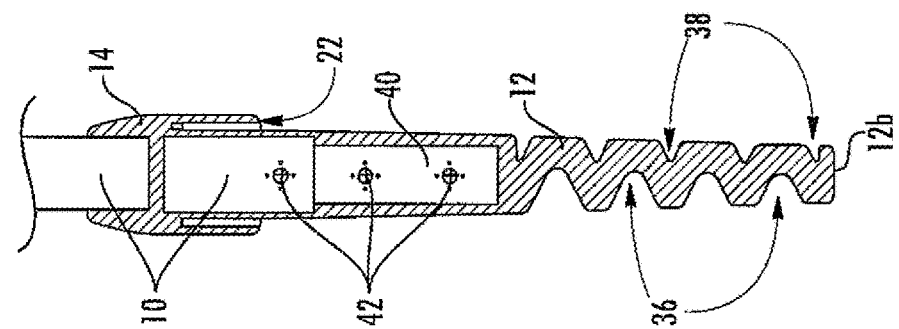
FIG. 8 is a side view of the connector.
Figure 9:
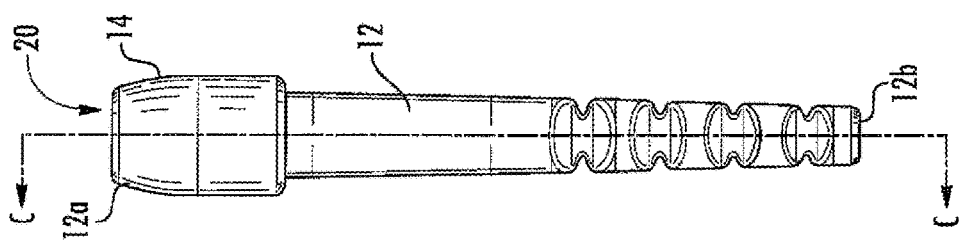
FIG. 9 is a front view of the connector.

FIGS. 6-9 show one embodiment of the connector 12. The connector 12 is preferably formed of an easily molded material such as, for example, polyethylene, polypropylene, or nylon. As mentioned above, the outside diameter of the flexible connector 12 can be constant, forming an elongated cylinder, but in some embodiments it is tapered slightly so it is larger at the first end 12a and smaller at the second end 12b to conform to the interior shape of most common tool sockets. The connector 12 is flexible so it can bend to conform to the curved shape of the socket 34 to fill the void inside the socket 34. The connector 12 applies equal pressure to the interior walls of the socket 34 to help prevent compression of the socket 34 from outside forces. To help make it flexible, a series of grooves 36, 38 are formed in the connector 12 and spaced from each other along the length of the connector 12. In one embodiment, the grooves 36, 38 begin near the middle (longitudinally) of the connector 12 and extend toward the second end 12b. As shown best in FIGS. 7 and 8, a first series of grooves 36 extend along the length of one side of the connector 12 and a second series of groves 38 extend along the length of a second opposite side of the connector 12. The first series of grooves 36 are larger (deeper and wider) than the grooves 38 in the opposite side of the connector 12. In the embodiment shown, the larger grooves 36 are in the back of the connector 12 (FIG. 6) and the smaller grooves 38 are in the front of the connector 12 (FIG. 9). The connector 12 works best when the connector 12 is aligned in the socket 34 such that the connector 12 bends in the direction of the larger grooves 36 as shown in FIG. 3. It is easier for the connector 12 to bend in the direction of the larger grooves 36 because there is less material in the connector 12 to restrict bending. In one embodiment, the angle created by the opposing surfaces 36a of the larger grooves 36 is between about 50 and 60 degrees and the angle created by the opposing surfaces 38a of the smaller grooves 38 is between about 30 and 60 degrees. It should be noted that each of the larger grooves 36 do not need to be identical in shape and angle and each of the smaller grooves 38 do not need to be identical in shape and angle. Thus, in one connector 12 the depth and angle of the series of larger grooves 36 or series of smaller grooves 38 may vary. As shown in FIG. 7, for example, the angle of the opposing surfaces 38a for the smaller grooves 38 located on each end is smaller than the angle of the opposing surfaces 38a for the three center grooves 38.

In one embodiment, the depth of the grooves 36, 38 is defined by each respective trough portion 36b, 38b. The material of the connector 12 between the grooves 36, 38 holds the connector 12 together. In other words, there is not a central shaft member which holds the connector 12 together because the connector 12 is generally hollow along its longitudinal axis. This allows the trough 36b of the larger grooves 36 to extend up to an even past the middle of the connector 12 wherein the middle is defined by longitudinal axis L shown in FIG. 8. As shown in FIG. 8, the larger groove trough portions 36b extends beyond the middle L of the connector 12. The creation of the troughs 36b up to or past the middle L of the connector 12 allows the connector 12 to bend at an increased radius of curvature relative to existing devices which have central shaft members or which have groove troughs that do not approach the middle of the connector.

As explained above and as shown in FIG. 7, the connector 12 may have a collar 14 with a larger diameter than the main body of the connector 12. An opening 22 is created between the main body of the connector 12 and the collar 14. The collar 14 has a larger diameter than the main body of the connector 12 and creates an opening 22 by extending downward over a portion of the main body of the connector 12. The outer surface of the tool head's socket 34 is received by the opening 22 (between a portion of the collar 14 and a portion of the main body of the connector 12) to help secure the head 32 to the handle assembly and provide stability and rigidity during operation of the tool.

Figure 4A:
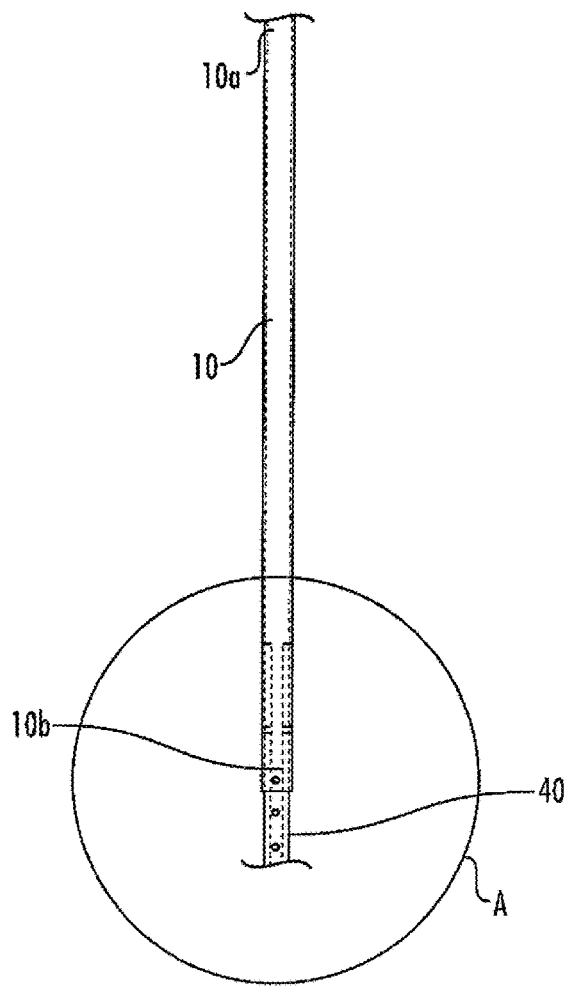
FIG. 4a is a front view of a handle.
Figure 4B:
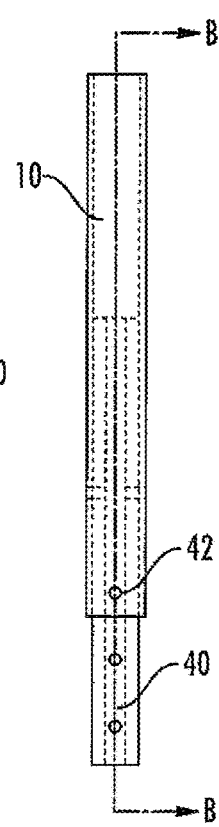
FIG. 4b is a detail view of area A from FIG. 4.
Figure 4C:
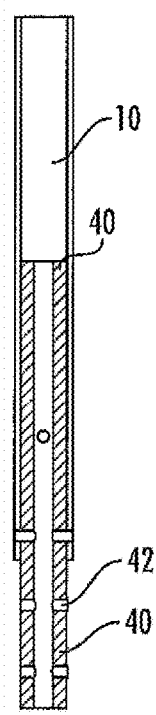
FIG. 4c is a section view taken along section lines B-B from FIG. 4b.

One aspect of the invention includes a method for forming the hand tool assembly described above. In this method, the handle assembly is formed first by combining the handle 10, rigid tube insert 40, and connector 12. Then, the connector 12 is inserted into the socket 34 to complete the hand tool assembly. In one embodiment the handle 10 may be made from fiberglass using any suitable method, including pultrusion. The handle 10 has an opening in its second end 10b adapted to receive a rigid tube insert 40. A first portion of the rigid tube insert 40 is positioned a short distance into the opening in the handle second end 10b so that it extends into the handle 10 between about 5-15% of the total length of the handle 10 and preferably into the handle 10 about 10% of the total length of the handle 10. The rigid tube insert 40 is retained in place by a frictional fit or glue or other fastening means. A second portion of the insert 40 extends a short distance outward from the handle second end 10b as shown in FIGS. 4a, 4b, and 4c. The rigid tube insert 40 may be made of any suitable material, including wood, metal, or fiberglass. In one embodiment the rigid tube insert 40 has a diameter smaller than the diameter of the handle 10 to allow it to fit inside the handle 10 and extend farther into the connector 12 since the connector 12 is tapered in some embodiments. In one embodiment the rigid tube insert 40 is made from pultruded fiberglass and is thick-walled, meaning that it is a solid piece with no internal cavity or a nearly solid piece with only a small cavity in the middle.

Once combined, the handle 10 and the rigid tube insert 40 are placed in a mold wherein the first end of the connector 12 is molded around them. As shown in FIGS. 3 and 7, the rigid tube insert 40 and the handle 10 both extend into the connector 12. The rigid tube insert 40 extends farther into the connector 12 than the handle 10 to help distribute force farther into the socket 34 since the point where the handle meets the socket is a weak point in traditional handle assemblies. The molding process permanently bonds the handle 10, rigid tube insert 40, and connector 12 together to create a single handle assembly unit. The creation of a single handle assembly unit reduces the steps required for assembly thereby increasing efficiency of final assembly of the head 32 to the handle assembly. In some embodiments the resultant handle assembly is placed in a mold wherein a grip is molded onto the first end 10. In an alternate embodiment, the connector 12 may be combined with the handle 10 using adhesives or fasteners to allow the connector 12 to be used in aftermarket products. In this embodiment the second end of the handle 10b is received by the opening 20 in the first end of the connector 12a.

Figure 5:
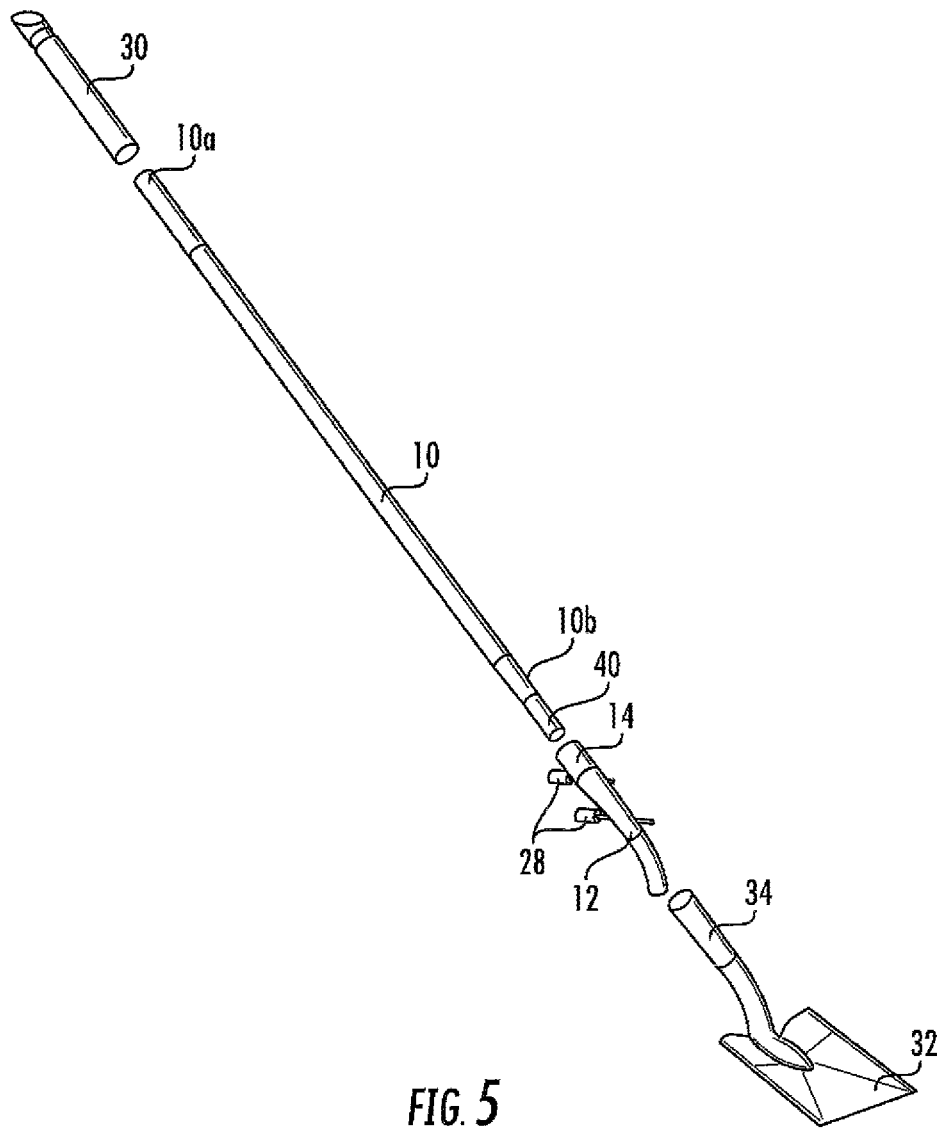
FIG. 5 is an exploded view of the hand tool assembly.
Figure 6:
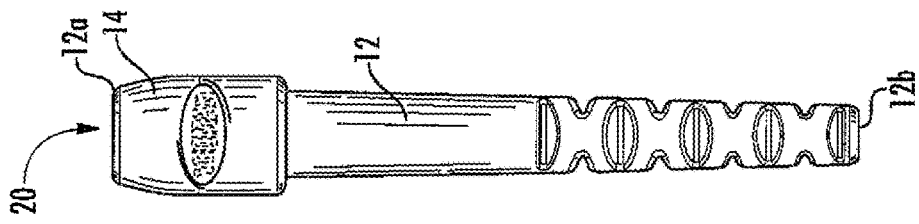
FIG. 6 is a rear view of a connector.

After creating the one-piece handle assembly described above which includes the handle 10, rigid tube insert 40, and connector 12, the second end of the connector 12b is then inserted into an opening/socket 34 in a work piece head 32 (e.g., a shovel or rake head). As explained in more detail above, the connector 12 is flexible thereby allowing it to pass through straight and curved portions of the socket 34. The first end of the connector 12a includes a collar 14 which has a larger diameter than the main body portion of the connector 12. As shown best in FIG. 7, there is an opening 22 between the main body of the connector 12 and the collar 14. The collar 14 has a larger diameter than the main body of the connector 12 which creates a gap or opening 22 by extending downward over a portion of the main body of the connector 12. As shown in FIG. 3, the outer surface of the socket 34 is received by the opening 22 (between a portion of the collar 14 and a portion of the main body of the connector 12) to help secure the head 32 to the handle assembly and provide stability and rigidity during operation of the tool. In one embodiment the head 32 may be further secured to the handle assembly using adhesives or fasteners 28. The fasteners 28 may be screws, bolts, or other suitable members and are shown in FIG. 5. The fasteners 28 may be inserted through one or more of the head 32 (i.e. through the neck/socket 34), connector 12, handle 10, and rigid tube insert 40 as illustrated by the placement of the openings 42 in FIGS. 3 and 7. Hooks or abraded surfaces protruding from the inner diameter of the socket 34 may also be employed to secure the head 32 to the handle assembly.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:
1. A hand tool assembly comprising:
a handle having a first end and a second end;
a tool head having a socket with an internal surface extending along a length;
a flexible connector having an outer surface, a first end combined with the second end of the handle, and a second end combined with the socket of the tool head;
wherein the flexible connector conforms to the shape of the socket and contacts the internal surface of the socket along its entire length; and
wherein the flexible connector applies coextensive pressure to the interior walls of the socket.
2. The hand tool assembly of claim 1 wherein the socket is curvilinear.

3. The hand tool assembly of claim 1 wherein the handle is elongated.

4. The hand tool assembly of claim 1 wherein the handle has increased resistance to bending forces.

5. The hand tool assembly of claim 4 wherein the handle is comprised of adhered layered material further having a hollow interior core.

6. The hand tool assembly of claim 4 wherein the handle within its interior contains a reinforcing rod comprised of a rigid material to reinforce the interior of the handle.

7. The hand tool assembly of claim 4 wherein the handle is reinforced by use of constant cross-sections in the form of roving and mats saturated with resin and cured extending substantially the entire length of the handle.

8. The hand tool assembly of claim 1 whereupon insertion of the connector into the socket substantially fills the void inside the socket.

9. A method of manufacturing a hand tool, comprising:
providing a handle having a connecting end with an opening therein;
combining a rigid tube insert with the handle by inserting the rigid tube insert into the opening so that a first portion of the rigid tube insert is received into the handle and a second portion of the rigid tube insert extends outward from the opening;
providing a connector having a collar integral thereto wherein the connector has a first end and a flexible second end;
combining a connector with the connecting end of the handle and the second end of the rigid tube insert;
inserting the flexible second end of the connector into a socket in a work piece head having a curved portion so that the flexible second end of the connector conforms to the shape of the curved portion of the socket and contacts an inner surface of the socket along the curved portion thereby substantially filling the void inside the socket.

10. The method of claim 9 wherein the work piece head is generally straight.

11. The method of claim 9 wherein the first portion of the rigid tube insert extends into the handle between 5-15% of the total length of the handle.

12. The method of claim 9 further comprising inserting fasteners through the work piece head, connector, handle, and rigid tube insert to secure the components together.

13. The method of claim 9 wherein the connector is molded around the connecting end of the handle and the second end of the rigid tube insert to permanently combine the components.

14. The method of claim 9 further comprising making the handle by pultrusion.

15. The method of claim 9 wherein the handle is comprised of fiberglass.

* * * * *